(12) United States Patent
Bourgeois et al.

(10) Patent No.: US 7,329,471 B2
(45) Date of Patent: Feb. 12, 2008

(54) METHODS AND APPARATUS FOR ASSEMBLING SOLID OXIDE FUEL CELLS

(75) Inventors: Richard Scott Bourgeois, Albany, NY (US); Richard Louis Hart, Albany, NY (US); Melvin Robert Jackson, Niskayuna, NY (US); Chang Wei, Niskayuna, NY (US); Canan Uslu Hardwicke, Niskayuna, NY (US); Michael Francis Xavier Gigliotti, Jr., Glenville, NY (US)

(73) Assignee: General Electric Company, Niskayuna, NY (US)

( * ) Notice: Subject to any disclaimer, the term of this patent is extended or adjusted under 35 U.S.C. 154(b) by 333 days.

(21) Appl. No.: 10/315,750

(22) Filed: Dec. 10, 2002

(65) Prior Publication Data
US 2004/0110054 A1    Jun. 10, 2004

(51) Int. Cl.
*H01M 8/24* (2006.01)
*H01M 8/12* (2006.01)

(52) U.S. Cl. ............................ 429/38; 429/32; 429/34; 429/30; 29/623.1

(58) Field of Classification Search ................. 429/38, 429/32, 34, 30; 29/623.1
See application file for complete search history.

(56) References Cited

U.S. PATENT DOCUMENTS

| | | | |
|---|---|---|---|
| 5,549,983 A | 8/1996 | Yamanis | |
| 5,688,610 A | 11/1997 | Spaeh et al. | |
| 5,770,327 A * | 6/1998 | Barnett et al. | 429/32 |
| 5,786,105 A | 7/1998 | Matsushima et al. | |
| 5,851,689 A * | 12/1998 | Chen | 429/13 |
| 6,096,449 A * | 8/2000 | Fuglevand et al. | 429/13 |
| 6,110,612 A | 8/2000 | Walsh | |
| 6,218,035 B1 | 4/2001 | Fuglevand et al. | |
| 6,296,962 B1 | 10/2001 | Minh | |
| 6,322,919 B1 | 11/2001 | Yang et al. | |
| 6,344,290 B1 | 2/2002 | Bossel | |
| 6,387,556 B1 | 5/2002 | Fuglevand et al. | |
| 6,468,682 B1 | 10/2002 | Fuglevand et al. | |
| 6,479,178 B2 * | 11/2002 | Barnett | 429/32 |
| 6,488,739 B1 | 12/2002 | Mazanec et al. | |
| 6,489,050 B1 * | 12/2002 | Ruhl et al. | 429/26 |
| 6,492,053 B1 | 12/2002 | Donelson et al. | |
| 2002/0024185 A1 | 2/2002 | Ghosh et al. | |

* cited by examiner

*Primary Examiner*—Patrick Joseph Ryan
*Assistant Examiner*—Angela J. Martin
(74) *Attorney, Agent, or Firm*—Ann M. Agosti; Patrick K. Patnode

(57) ABSTRACT

A solid oxide fuel cell comprises at least one hollow manifold, an anode, an electrolyte, and a cathode. The at least one hollow manifold comprises a wall that defines a chamber therein. A plurality of openings extending through, such that the plurality of openings are in flow communication with the chamber. The anode is formed on an exterior surface of the wall. The electrolyte is deposited on the anode, and the cathode is deposited on the electrolyte.

14 Claims, 5 Drawing Sheets

METHODS AND APPARATUS FOR ASSEMBLING SOLID OXIDE FUEL CELLS

BACKGROUND OF THE INVENTION

This invention relates generally to power generation, and more specifically, to methods and apparatus for assembling solid oxide fuel cells.

At least some known power generation systems use fuel cells to produce power. Known fuel cells typically include an anode, also known as a fuel electrode, a cathode, also known as an oxidant electrode, and an electrolyte. Such fuel cells are electrochemical devices, similar to batteries, which react fuel and oxidant to produce electricity. However, unlike batteries, fuel such as hydrogen and oxidant such as air are supplied continuously to the fuel cell such that it continues to produce power so long as such reactants are provided.

A fuel cell produces electricity by catalyzing fuel and oxidant into ionized atomic hydrogen and oxygen at, respectively, the anode and cathode. The electrons removed from hydrogen in the ionization process at the anode are conducted to the cathode where they ionize the oxygen. In the case of a solid oxide fuel cell, the oxygen ions are conducted through the electrolyte where they combine with ionized hydrogen to form water as a waste product and complete the process. The electrolyte is otherwise impermeable to both fuel and oxidant and merely conducts oxygen ions. This series of electrochemical reactions is the sole means of generating electric power within the fuel cell. It is therefore desirable to reduce or eliminate any mixing of the reactants, as such mixing would result in a different combination such as combustion which produces no electric power and therefore reduces the efficiency of the fuel cell.

Individual fuel cells produce power at low voltage, typically about 1 Volt per cell. The cells are therefore typically assembled in electrical series in a fuel cell stack to produce power at useful voltages. To create a fuel stack, an interconnecting member is used to connect the adjacent fuel cells together in electrical series. Often the interconnecting member also performs the function of separating the reactants flowing through the fuel cell stack. The number of fuel cells that may be coupled together and/or an operating efficiency of the fuel stack may be adversely impacted by the interconnecting member. For example, at least some known fuel cell interconnecting members may not adequately maintain a separation of the reactants flowing through the fuel cell when the fuel cell is operated at high temperatures, such as between approximately 600° Celsius (C.) and 1000° C.

To facilitate maintaining the separation between reactants, at least some known fuel cells have seal assemblies. For example, at least some known fuel cell seals are fabricated using glass or glass ceramics, however glass or glass-ceramic seals may not be reliable under thermal cycling. Other known fuel cells have seals fabricated using mica materials, metallic, ceramic or composite materials. Although such seals generally withstand the thermal cycling better than the seals fabricated with glass, such seals have not proven to provide substantially leak tight seals.

BRIEF DESCRIPTION OF THE INVENTION

In one aspect, a solid oxide fuel cell is provided. The fuel cell comprises at least one hollow manifold, an anode, an electrolyte, and a cathode. The at least one hollow manifold comprises a wall that extends between a first end and a second end, such that a chamber is defined therein by said wall. A plurality of openings extend through the manifold wall such that the plurality of openings are in flow communication with the chamber. The anode is formed on the manifold wall. The electrolyte is deposited on the anode, and the cathode is deposited on the electrolyte.

In another aspect of the invention, a fuel cell stack is provided. The fuel cell stack includes a first solid oxide fuel cell and a second solid oxide fuel cell. The first solid oxide fuel cell and the second solid oxide fuel cell are electrically coupled together in series in a stack configuration such that at least one sealed passage extends between the first and the second solid oxide fuel cells. The first and second fuel cells each comprise a hollow manifold, an anode, an electrolyte, and a cathode. The manifold comprises a continuous wall extending between a first end and a second end, such that a chamber is defined therein. The wall includes a plurality of openings extending therethrough in flow communication with the chamber. The anode is on the manifold wall. The electrolyte is on the anode, and the cathode is on the electrolyte.

In a further aspect, a method for fabricating a fuel cell stack is provided. The method comprises forming a first solid oxide fuel cell and a second solid oxide fuel cell, wherein the first and second solid oxide fuel cells each include a manifold formed from a wall that defines a chamber therein. A plurality of openings extend through the wall and are in flow communication with the chamber. The method also includes forming an anode on the top wall, depositing an electrolyte on said anode, and depositing a cathode on the electrolyte.

DETAILED DESCRIPTION OF THE INVENTION

Figure 1:
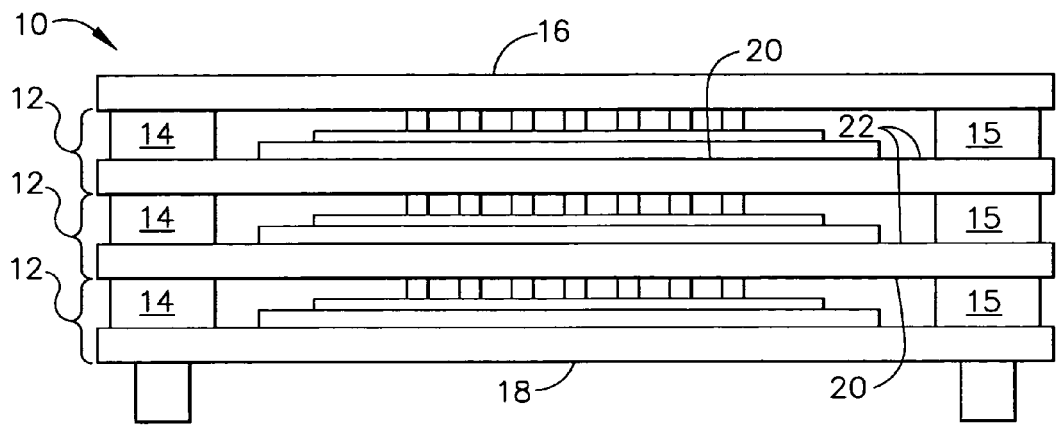
FIG. 1 is a side view of an exemplary fuel cell stack.

FIG. 1 is a cross-sectional view of an exemplary fuel cell stack 10 that includes a plurality of fuel cells 12. Adjacent fuel cells 12 are separated by a plurality of inlet seal passages 14 and a plurality of exit seal passages 15. Seal passages 14 and 15 typically comprise a hollow electrical insulator (not shown) that may be fabricated from, but is not limited to, a ceramic material. In one embodiment, the insulator is coupled to manifolds 20 and end plates 16 and 18 by seals that may be fabricated from, but are not limited to, a glass or a glass ceramic material. Alternatively, the insulators may be coupled to manifolds 20 and end plates 16 and 18 by other fabrication processes, such as, but not limited to brazing. Fuel cell stack 10 includes a top stack plate 16, a bottom stack plate 18, and a plurality of manifolds 20 that are positioned between top stack plate 16 and bottom stack plate 18. Each manifold 20 includes an outer surface 22.

In the exemplary embodiment, top stack plate 16, bottom stack plate 18, and manifolds 20, are each sized identically. In an alternative embodiment, at least one of top stack plate 16, bottom stack plate 18, and/or manifolds 20 is sized differently than the remaining fuel cell stack components. Top stack plate 16 is substantially solid and bottom stack plate 18 is substantially hollow. Stack plates 16 and 18 are both fabricated from an electrically-conductive material. For example, stack plates 16 and 18 may be fabricated from conductive materials capable of operating at higher temperatures as described herein, such as, any material that is electrically conductive, or any material that if subject to oxidation, its oxide is conductive. Each manifold 20 is also fabricated from an electrically conductive material, such as, but not limited to, conductive materials capable of operating at higher temperatures as described herein, such as, but not limited to, a stainless steel.

Figure 2:
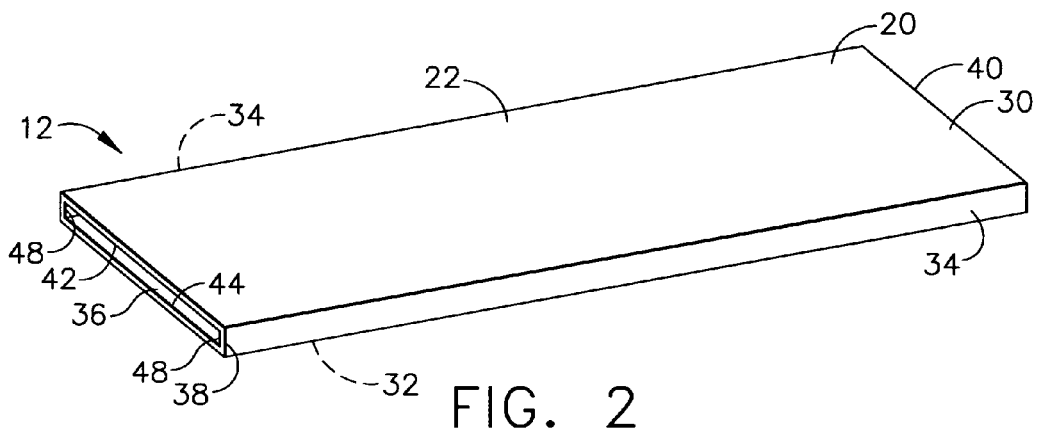
FIG. 2 is a portion of a fuel cell that may be used with the fuel cell stack shown in FIG. 1 during an initial fabrication stage.

FIG. 2 is a portion of a fuel cell 12 that may be used with fuel cell stack 10 (shown in FIG. 1). More specifically, FIG. 2 illustrates a fuel manifold 20 in an initial fabrication stage. Each fuel manifold 20 includes a top wall 30, a bottom wall 32, and a pair of sidewalls 34 that connect top and bottom walls 30 and 32, respectively. In the exemplary embodiment, manifold 20 is substantially rectangular, and sidewalls 34 extend substantially perpendicularly between top wall 30 and bottom wall 32. In an alternative embodiment, manifold 20 is non-rectangular and at least sidewall 34 extends obliquely between top and bottom walls 30 and 32, respectively.

Fuel manifold 20 is hollow and includes a channel 36 that extends from a first end 38 of fuel manifold 20 to a second end 40 of manifold 20. More specifically, in the exemplary embodiment, channel 36 is defined by an inner surface 42, 44, and 48, of each respective top wall 30, bottom wall 32, and sidewalls 34. Accordingly, in the exemplary embodiment, channel 36 has a substantially rectangular cross-sectional profile. In another embodiment, channel 36 has a non-rectangular cross-sectional profile. In another embodiment, fuel manifold 20 contains at least one of flow guides, baffles, or channeling features to facilitate distributing fuel within fuel manifold 20.

Figure 3:
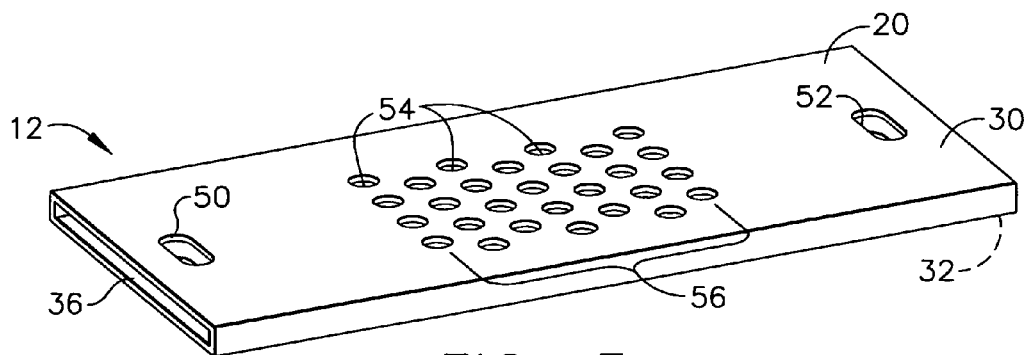
FIG. 3 is a portion of the fuel cell shown in FIG. 2 during a first fabrication stage.

FIG. 3 is a portion of fuel cell 12 shown during a first fabrication stage. During this stage of fabrication, a supply opening 50 and a return opening 52 are formed within fuel manifold 20. More specifically, supply opening 50 and return opening 52 each extend through fuel manifold top wall 30, through channel 36, and through fuel manifold bottom wall 32. In the exemplary embodiment, openings 50 and 52 are sized identically. Alternatively, opening 50 and opening 52 are sized differently. Additionally, in the exemplary embodiment, openings 50 and 52 each have a substantially circular cross-sectional profile. Alternatively, at least one of opening 50 and/or opening 52 has a non-circular cross-sectional profile.

A plurality of openings 54 are also formed in fuel manifold 20 during this fabrication stage. More specifically, openings 54 extend through fuel manifold top wall 30 into channel 36, but unlike openings 50 and 52, openings 52 do not extend through manifold bottom wall 32. In the exemplary embodiment, openings 54 are arranged in a substantially colinear configuration, i.e. openings 54 are arranged in a plurality of rows 56, wherein each row 56 includes a plurality of openings 54 arranged in a linear sequence. Additionally, in the exemplary embodiment, each opening 54 has a substantially circular cross-sectional profile. Alternatively, each opening 54 has a non-circular cross-sectional profile.

Figure 4:
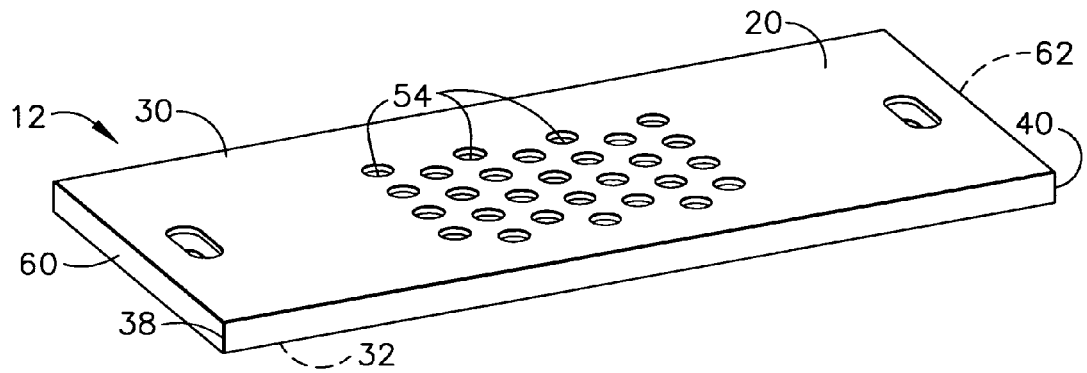
FIG. 4 is a portion of the fuel cell shown in FIG. 2 during a second fabrication stage.

FIG. 4 is a portion of a fuel cell 12 shown during a second fabrication stage. During this stage of fabrication, a pair of identical end plates 60 and 62 are mechanically coupled to manifold first end 38 and second end 40, respectively. More specifically, in the exemplary embodiment, each end plate 60 and 62 is coupled to manifold 20 such that end plates 60 and 62 extend substantially perpendicularly between manifold top wall 30 and bottom wall 32. In an alternative embodiment, at least one of end plate 60 and/or end plate 62 is obliquely coupled to manifold 20 with respect to top wall 30 and/or bottom walls 32. End plates 60 and 62 are fabricated from an electrically conductive material, such as, but not limited to, conductive materials capable of operating at higher temperatures as described herein, such as, but not limited to, a stainless steel. In an alternative embodiment, end plates 60 and 62 are fabricated from non-electrically conductive material.

Figure 5:
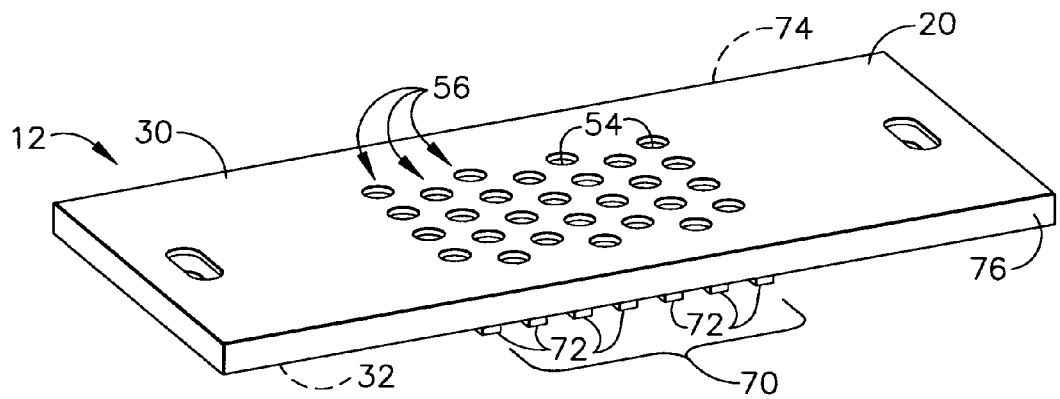
FIG. 5 is a portion of the fuel cell shown in FIG. 2 during a third fabrication stage.

FIG. 5 is a portion of fuel cell 12 during a third fabrication stage. During this stage of fabrication, a cathode flow field 70, including a plurality of dividers 72, is coupled to manifold bottom wall 32. In one embodiment, cathode flow field 70 is mechanically coupled to manifold 20. Dividers 72 extend between sidewalls 34 along bottom wall 32, such that each divider 72 is oppositely disposed from, and substantially parallel between adjacent respective rows 56 of openings 54. In the exemplary embodiment, dividers 72 function as an electrical interconnect between adjacent manifolds 20. For example, dividers 72 are configured such that when fuel cells 12 are in a stacked arrangement (shown in FIG. 1), dividers 72 conduct electricity from an anode of one cell 12 to a cathode of an adjacent cell 12. In an exemplary embodiment, dividers 72 are fabricated from an electrically conductive material, such as, but not limited to, conductive materials capable of operating at higher temperatures as described herein, such as, but not limited to, a stainless steel. In one embodiment, dividers 72 are formed integrally with bottom wall 32.

Figure 6:
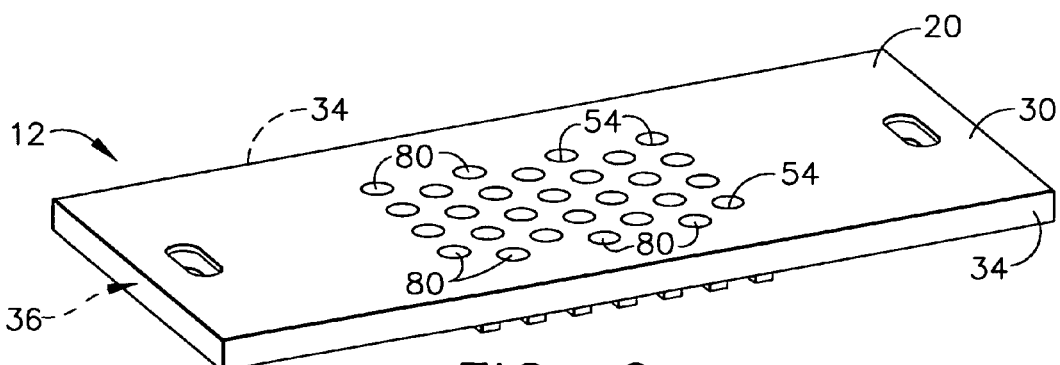
FIG. 6 is a portion of the fuel cell shown in FIG. 2 during a fourth fabrication stage.

FIG. 6 is a portion of fuel cell 12 during a fourth fabrication stage. During this stage of fabrication, an expendable material 80, i.e. a fugitive mask, is inserted within openings 54 such that material 80 within openings 54 is substantially planar with manifold top wall 30 outer surface 22. In one embodiment, expendable material 80 includes, but is not limited to including, an epoxy material.

Figure 7:
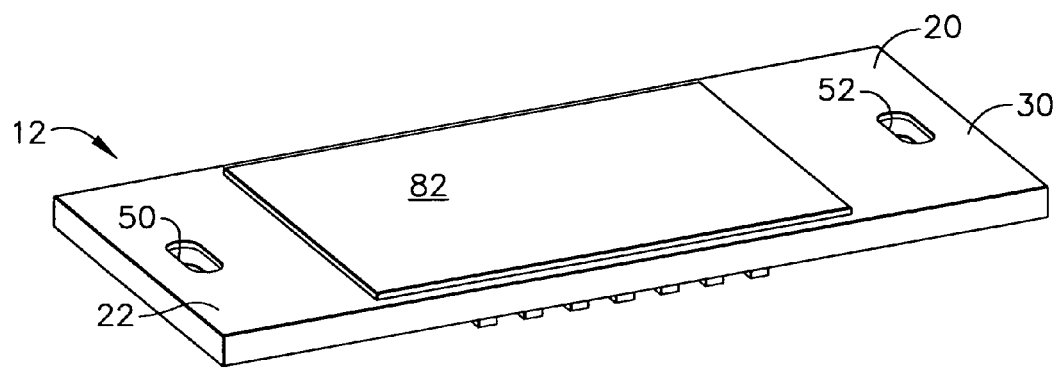
FIG. 7 is a portion of the fuel cell shown in FIG. 2 during a fifth fabrication stage.

FIG. 7 is a portion of fuel cell 12 during a fifth subsequent fabrication stage. During this fabrication stage, an anode 82 is formed across manifold top wall 30, and across exposed portions of expendable material 80 formed in openings 54. More specifically, because openings 54 (shown in FIGS. 3-6) are filled with expendable material 80 (shown in FIG. 6), anode 82 remains formed across manifold top wall 30 and is not deposited within openings 54 and/or channel 36. Anode 82 extends generally over openings 54 but does not extend over surface 22 to openings 50 and 52. Furthermore, anode 82 does not extend to an outer perimeter of manifold top wall 30 adjacent sidewalls 34.

Expendable material 80 is then removed using a known removal process, such as, but not limited to, heating or burning. In an alternative embodiment, anode 82 is formed across manifold 20 and openings 54, but expendable material 80 is not inserted into openings 54 prior to forming anode 82. In one embodiment, anode 82 may be fabricated from a porous material, such as, but is not limited to, yttrium-stabilized zirconia (YSZ) that includes a nickel oxide material.

Figure 8:
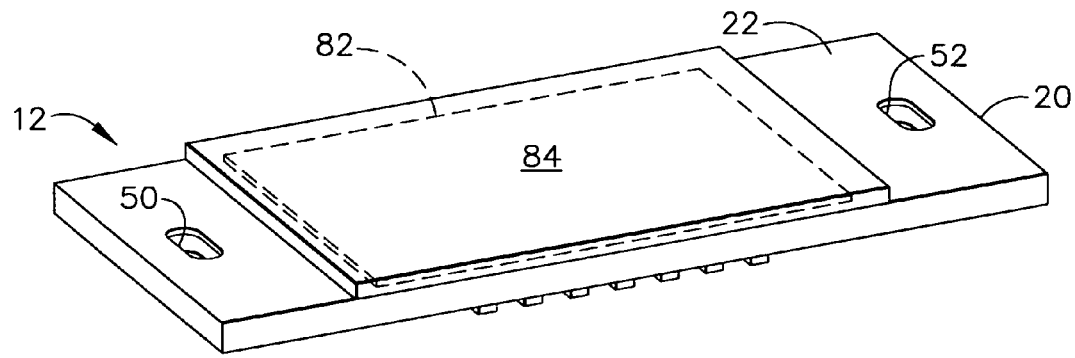
FIG. 8 is a portion of the fuel cell shown in FIG. 2 during a sixth fabrication stage.

FIG. 8 is a portion of fuel cell 12 shown during a sixth fabrication stage. During this fabrication stage, an electrolyte layer 84 is formed on anode 82. Specifically, electrolyte layer 84 is formed to have a surface area that is at least co-extensive with, or greater than a surface area of anode 82, such that layer 84 is bonded directly to at least a portion of manifold top wall surface 22. More specifically, electrolyte layer 84 is bonded to surface 22 between anode 82 and each opening 50 and 52, and is also bonded to surface 22 between anode 82 and sidewalls 34. In the exemplary embodiment, electrolyte layer 84 is extended across surface 22 to the outer perimeter formed adjacent sidewalls 34. In one embodiment, electrolyte layer 84 may be fabricated from a material such as, but is not limited to, yttrium-stabilized zirconia (YSZ).

Figure 9:
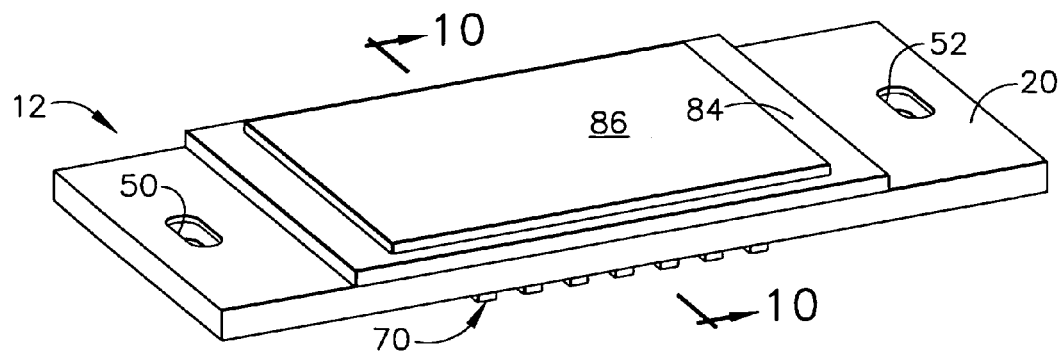
FIG. 9 is a portion of the fuel cell shown in FIG. 2 during a seventh fabrication stage.
Figure 10:
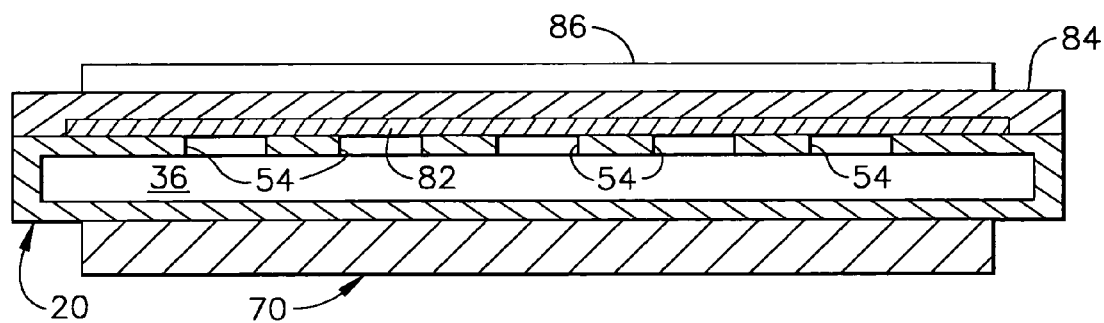
FIG. 10 is a cross-sectional view of the fuel cell shown in FIG. 9 taken along line 10-10.

FIG. 9 is a portion of fuel cell 12 shown during a seventh fabrication stage. FIG. 10 is a cross-sectional view of fuel cell 12 taken along line 10-10 (shown in FIG. 9). During this stage of fabrication, a cathode 86 is formed on electrolyte layer 84. In the exemplary embodiment, cathode 86 is formed with a surface area that is less than a surface area of electrolyte layer 84, such that cathode 86 is only bonded to electrolyte layer 84. Cathode 86 may include, but is not limited to, Lanthanum Strontium Manganate (LSM).

During use, as described in more detail below, when a fluid enters manifold 20 through opening 50, fluid flow is channeled through channel 36 and contacts anode 82 through openings 54. Fluid flow is then discharged from manifold 20 through opening 52.

Figure 11:
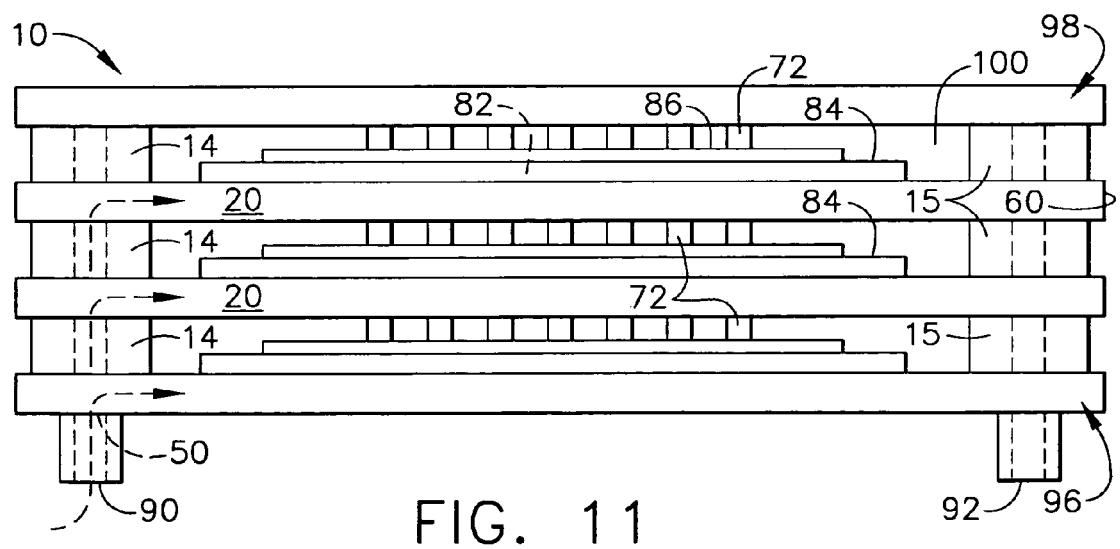
FIG. 11 is a side view of an exemplary fuel cell stack.

FIG. 11 is a cross-sectional view of fuel cell stack 10 including a plurality of manifolds 20 fabricated as described above. Adjacent fuel cells 12 are separated by a plurality of inlet and exit seals 14 and 15, respectively, such that fuel cells 12 form a planar arrangement of solid oxide fuel cells, i.e. a fuel stack 10, wherein adjacent fuel cells 12 define an oxidant flow area 100 therebetween. In one embodiment, seals 14 and 15 are installed under compression to facilitate enhanced sealing and enhanced hermeticity. Additionally, because manifold sealing is entirely metal to metal, an overall length of seals 14 and 15 is reduced, as seals 14 and 15 extend only around openings 50 and 52. Accordingly, seals 14 and 15 facilitate reducing assembly costs of stack 10.

A fuel, such as, but not limited to, a preformed fuel, and/or a hydrocarbon which is reformed within fuel cell stack 10, is supplied to fuel cell stack 10 through an inlet connection 90. After entering inlet connection 90, fuel is routed through each inlet seal 14 and enters each fuel manifold 20 through a respective opening 50.

After entering each opening 50, fuel is then routed into each respective manifold channel 36. Fuel flows over and reacts with each anode 82 prior to being discharged from fuel stack 10 through openings 52 into an outlet connection 92. In one embodiment, connections 90 and 92 are welded to stack 10. Fuel and oxidant react in each fuel cell 12, which are connected in series within stack 10, to build voltage to useful levels. More specifically, the fuel reacts electrochemically with oxygen, supplied to stack 10, to generate direct current (DC) electricity with water as the main product. An oxidant surrounding stack 10, flows over cathode 86 and is channeled through flowfield 70 which functions as an interconnect. In one embodiment, stack 10 is arranged such that the directions of reactant flowing through adjacent manifolds 20 are substantially parallel and in opposite flow directions. In another embodiment, stack 10 is arranged such that the directions of reactant flowing through adjacent manifolds 20 are substantially parallel and in the same flow direction. In another embodiment, manifolds 20 are arranged within stack 10 such that the directions of reactant flowing through adjacent manifolds 20 are substantially perpendicular to each other.

As current is generated as the fuel and oxidant react, a voltage potential is generated across stack end plates 96 and 98. Endplate 96 is substantially similar to bottom stack plate 18 (shown in FIG. 1) and does not include cathode flow channels 70. In the exemplary embodiment, end plate 96 is a positive endplate. Endplate 98 is substantially similar to top stack plate 16 and is substantially solid, such that a channel 36 does not extend therethrough.

Fuel cells 12 are assembled to form a vertical stack 10. More specifically, cells 12 are assembled in a planar stack 10 to facilitate interconnecting adjacent fuel cell anodes 82, electrolytes 84, and cathodes 86. Accordingly, each manifold 20 includes at least two manifold openings 50 and 52 which extend through the plane of each interconnect. End plates 96 and 98 substantially seal stack 10 and such that current may be collected therein. Fuel flowing through interconnected manifolds 20, which are separated by seals 14 and 15, wets anode 82 through openings 54 formed in each manifold 20. In one embodiment, fuel cell 12 includes an internal reformer positioned upstream from each respective anode area to form $H_2$ and CO from a hydrocarbon.

Water, reforming products, and unused fuel flow through manifolds 20 to each respective exhaust openings 52. Stack 10 distributes fuel flow substantially equally to each fuel cell 12 coupled in series within 10. On the cathode side, passages are formed in, or defined by components coupled to, each manifold 20 to enable oxidant from outside stack 10 to be channeled through cathode flow field 70 and across cathode 86 prior to being discharged from the opposite side of stack 10.

When cell units 12 are stacked together, oxidant surrounds stack 10 and is channeled through stack 10 through flow area openings 100. To isolate fuel flowing through stack 10 from the oxidant surrounding and flowing through stack 10, electrolyte 84 is deposited such that anode 82 is overlapped, and such that electrolyte 84 is sealed directly to fuel manifold 20. Electrolyte 84 is substantially impermeable to gases, and facilitates conducting oxygen ions between cathode 86 and anode 82. Seals 14 and 15, positioned around openings 50 and 52, respectively, facilitate sealing individual fuel cells 12. Additionally, seals 14 and 15 facilitate electrically isolating adjacent fuel cells 12 to prevent short-circuiting between cells 12.

In use, stack 10 facilitates reducing a quantity of seals used in comparison to at least some other known planar fuel cell configurations. Furthermore, the substantially planar manifolded design of stack 10 permits separated exhaust recycling, and multiple staging of stacks 10. Accordingly, the number of manifolds 20 coupled in series is variably selected to facilitate optimizing heat transfer within stack 10. Additionally, operating costs associated with stack 10 are facilitated to be reduced in comparison to other known fuel cell stacks because the longest current path is through highly conductive metal. Accordingly, fuel cell stack 10 may be used with fuel cells fabricated by sintered and non-sintered assembly processes.

Figure 12:
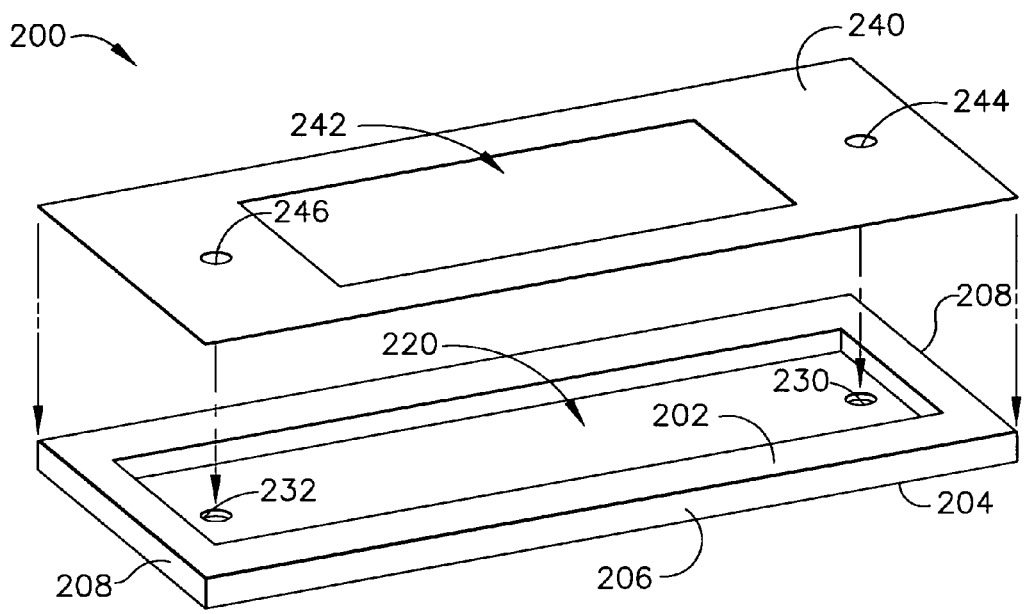
FIG. 12 is a side perspective exploded view of an alternative embodiment of a manifold that may be used with the fuel cell stack shown in FIGS. 1 and 11.

FIG. 12 is a side perspective exploded view of an alternative of a manifold that may be used with the fuel cell stack shown in FIGS. 1 and 11. More specifically, manifold 200 is substantially similar to manifold 20 shown in FIG. 4, but is assembled using an alternative fabrication method. More specifically, manifold 200 is also fabricated from an electrically conductive material, such as, but not limited to, conductive materials capable of operating at higher temperatures as described herein, such as, but not limited to, a stainless steel.

Fuel manifold 200 is initially substantially solid and includes a top wall 202, a bottom wall 204, and a pair of sidewalls 206 that connect top and bottom walls 202 and 204, respectively. Manifold 200 also includes a pair of end walls 208 that extend between top and bottom walls 202 and 204, respectively. In the exemplary embodiment, manifold 200 is substantially rectangular, and sidewalls 206 and end walls 208 extend substantially perpendicularly between top wall 202 and bottom wall 204. In an alternative embodiment, manifold 200 is non-rectangular.

A cavity 220 is formed within manifold 200 that extends from top wall 202 towards bottom wall 204. Cavity 220 has a cross-sectional area that is smaller than a cross-sectional area of top wall 202. Because cavity 220 is substantially centered with respect to top wall 200, cavity 220 does not extend to sidewalls 206 or end walls 208. In one embodiment, manifold cavity 220 is formed by stamping. In an alternative embodiment, manifold cavity 220 is formed by machining.

A supply opening 230 and a return opening 232 are formed within fuel manifold 200 and each extends through fuel manifold bottom wall 204 into fuel manifold cavity 220. In the exemplary embodiment, openings 230 and 232 are sized identically. Alternatively, opening 230 and opening 232 are sized differently. Additionally, in the exemplary embodiment, openings 230 and 232 each have a substantially circular cross-sectional profile. Alternatively, at least one of opening 230 and/or opening 232 has a non-circular cross-sectional profile.

A sealing plate 240 having a cross-sectional profile that is substantially sized identically to fuel manifold top wall 202 is coupled to top wall 202. Sealing plate 240 includes a center opening 242 that permits communication with an anode (not shown in FIG. 12), and also includes a supply opening 244 and a return opening 246 that are sized substantially identically with respective openings 230 and 232. Accordingly, after sealing plate 240 is coupled to top wall 202, fuel manifold 200 and a respective fuel cell (not shown in FIG. 12) are assembled as described above in FIGS. 5-11.

In an alternative embodiment, fuel manifold 200 is assembled using more than two layers. For example, in one embodiment, fuel manifold 200 sealing plate 240 is coupled to an annular sidewall wall assembly (not shown) which is then coupled to a lower sealing plate that is substantially similar to sealing plate 240, but does not include center opening 242.

Figure 13:
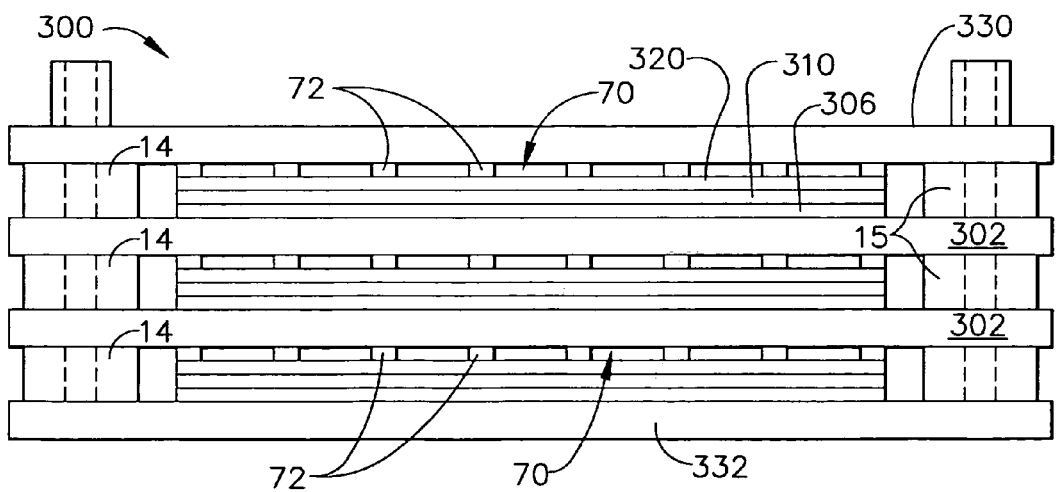
FIG. 13 is a side view of an alternative embodiment of a fuel cell stack.

FIG. 13 is a side view of an alternative embodiment of a fuel cell stack 300. Fuel cell stack 300 is substantially similar to fuel cell stack 10 shown in FIGS. 1 and 11, and components in stack 300 that are identical to components in stack 10 are identified in FIG. 13 using the same reference numerals used in FIGS. 1 and 11. Specifically, fuel cell stack 300 includes a plurality of manifolds 302 separated by a plurality of inlet seals 14 and a plurality of exit seals 15.

Manifolds 302 are similar to manifolds 20 (shown in FIGS. 1 and 11, however each manifold 302 is formed integrally with a first electrode, such that each manifold 302 functions as the first electrode. In one embodiment, manifold 302 includes a plurality of internal guides that channel fluid flow therethrough. An electrolyte layer 306, similar to electrolyte layer 84 (shown in FIG. 8) is formed on manifold 302, and a second electrode 310 is formed across electrolyte layer 306. In one embodiment, manifold 302 is the anode and the first reactant is fuel. In another embodiment, manifold 302 is the cathode, and the first reactant is the oxidant.

An electrical interconnect 320 is formed across second electrolyte layer 310 and interacts with flow dividers 72 that extend within a flow field 70 and are coupled to a bottom wall 322 of manifold 302. In the exemplary embodiment, interconnect 320 is substantially planar.

An upper and a lower stack current terminal 330 and 332, respectively, are also coupled to fuel cell stack 300, and function in a similar manner as top stack plate 96 and bottom stack plate 98, (shown in FIG. 11). As current is generated as the fuel and oxidant react, a voltage potential is generated across stack terminals 330 and 332. In the exemplary embodiment, terminal 330 is sized substantially identically to terminal 332, and includes a pair of openings (not shown) to permit flow into supply and return openings (not shown) formed within manifolds 302.

The above-described fuel stack is assembled with a plurality of fuel cells that are coupled in series using a substantially planar manifolded design such that the cathode of one fuel cell is in contact with the conductive fuel tube of an adjacent fuel cell. Surface features on the fuel tubes permit a small gap through which oxidant can flow over the cathode. Fuel is supplied to appropriate parts of the stack through an internal manifold formed from a series of substantially co-linear openings in the fuel stack. An insulated series of members separate adjacent fuel cells and provide sealing between adjacent fuel cells. As a result, the fuel cells facilitate manufacturing fuel stacks in a cost-effective and reliable manner.

Exemplary embodiments of fuel cell stacks are described above in detail. The fuel cell stacks are not limited to the specific embodiments described herein, but rather, components of each assembly may be utilized independently and separately from other components described herein. Each fuel cell stack component can also be used in combination with other fuel cell stack components. For example, in certain embodiments, the relative positions of the anode and the cathode within the stack may be exchanged, and similarly passages defined for fuel flow and oxidant may also be exchanged.

While the invention has been described in terms of various specific embodiments, those skilled in the art will recognize that the invention can be practiced with modification within the spirit and scope of the claims.

What is claimed is:

1. A solid oxide fuel cell comprising:
   at least one hollow manifold comprising a top wall, a bottom wall, and a plurality of sidewalls, said plurality of sidewalls extending substantially perpendicularly between said top wall and said bottom wall, said top wall, said bottom wall, and said sidewalls defining a chamber therein, said top wall, said bottom wall, or combinations thereof including fuel supply and return openings, said top wall comprising a manifold wall comprising a plurality of manifold openings extending therethrough in flow communication with said chamber, said bottom wall not including manifold openings extending therethrough along said bottom wall;
an anode on an exterior surface of said manifold wall;
an electrolyte on said anode; and
a cathode on said electrolyte.

2. A solid oxide fuel cell in accordance with claim 1 wherein said at least one hollow manifold further comprises an electrically conductive material.

3. A solid oxide fuel cell in accordance with claim 1 wherein said anode is bonded directly to said at least one manifold.

4. A solid oxide fuel cell in accordance with claim 1 wherein said electrolyte is at least coextensive with said anode, said electrolyte is bonded directly to said at least one manifold.

5. A solid oxide fuel cell in accordance with claim 1 wherein said electrolyte is substantially impermeable to a gas, and is configured to conduct oxygen ions between said cathode and said anode.

6. A fuel cell stack comprising:
a first solid oxide fuel cell and a second solid oxide fuel cell, said first solid oxide fuel cell and said second solid oxide fuel cell electrically coupled together in series in a stack configuration such that at least one sealed passage extends between said first and said second solid oxide fuel cells, said first and second fuel cell each comprising:
at least one hollow manifold comprising a top wall, a bottom wall, and a plurality of sidewalls, said plurality of sidewalls extending substantially perpendicularly between said top wall and said bottom wall, said top wall, said bottom wall, and said sidewalls defining a chamber therein, said top wall, said bottom wall, or combinations thereof including fuel supply and return openings, said top wall comprising a manifold wall comprising a plurality of manifold openings extending therethrough in flow communication with said chamber, said bottom wall not including manifold openings extending therethrough along said bottom wall;
an anode on an exterior surface of said manifold wall;
an electrolyte on said anode; and
a cathode on said electrolyte.

7. A fuel cell stack in accordance with claim 6 further comprising a cathode flow channel coupled to at least one of said first solid oxide fuel cell manifold and said second solid oxide fuel cell manifold, said cathode flow channel for directing a gas between said first and said second solid oxide fuel cells.

8. A fuel cell stack in accordance with claim 6 wherein at least one of said first solid oxide fuel cell manifold and said second solid oxide fuel cell manifold is substantially rectangular.

9. A fuel cell stack in accordance with claim 6 wherein at least one of said first solid oxide fuel cell manifold and said second solid oxide fuel cell manifold further comprises an electrically conductive material.

10. A fuel cell stack in accordance with claim 6 wherein each said electrolyte is at least coextensive with each said anode such that each said electrolyte is bonded to said manifold.

11. A fuel cell stack in accordance with claim 6 wherein each said manifold comprises a pair of end plates coupled to a first end and a second end of said manifold.

12. A fuel cell stack in accordance with claim 6 wherein said electrolyte is substantially impermeable to a gas, and is configured to conduct oxygen ions between said cathode and said anode.

13. A fuel cell stack in accordance with claim 6 wherein said at least one sealed passage comprises a pair of seal members positioned between said first and second solid oxide fuel cells, said plurality of seal members configured to electrically insulate said first solid oxide fuel cell from said second-solid oxide fuel cell.

14. A fuel cell stack in accordance with claim 6 further comprising a substantially hollow cathode end plate and a substantially solid anode end plate.

* * * * *